US010856385B2

(12) United States Patent
Altinger et al.

(10) Patent No.: US 10,856,385 B2
(45) Date of Patent: Dec. 1, 2020

(54) LIGHTING DEVICE AND LIGHTING SYSTEM FOR A MOTOR VEHICLE AND METHOD FOR OPERATING A LIGHTING SYSTEM FOR A MOTOR VEHICLE

(71) Applicant: Bayerische Motoren Werke Aktiengesellschaft, Munich (DE)

(72) Inventors: Florian Altinger, Shenyang (CN); Juergen Bruegl, Munich (DE); Robert Isele, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/403,238

(22) Filed: May 3, 2019

(65) Prior Publication Data

US 2019/0327814 A1 Oct. 24, 2019

Related U.S. Application Data

(63) Continuation of application No. PCT/EP2017/076527, filed on Oct. 18, 2017.

(30) Foreign Application Priority Data

Nov. 7, 2016 (DE) .................. 10 2016 221 771

(51) Int. Cl.
*H05B 45/10* (2020.01)
*H05B 45/24* (2020.01)
(Continued)

(52) U.S. Cl.
CPC ........... *H05B 45/24* (2020.01); *B60Q 1/0023* (2013.01); *B60Q 3/60* (2017.02); *B60Q 3/80* (2017.02);
(Continued)

(58) Field of Classification Search
CPC ........ H05B 37/02; H05B 33/08; H05B 45/00; H05B 45/10; H05B 45/24; H05B 47/00;
(Continued)

(56) References Cited

U.S. PATENT DOCUMENTS 7,014,336 B1 * 3/2006 Ducharme ............. H05B 45/20
362/231
2010/0219758 A1 9/2010 Melzner et al.
(Continued)

FOREIGN PATENT DOCUMENTS

CN 101662863 A 3/2010
CN 204518157 U 7/2015
(Continued)

OTHER PUBLICATIONS

Chinese Office Action issued in Chinese counterpart application No. 201780049989.7 dated Sep. 18, 2019, with English translation (Fifteen (15) pages).
(Continued)

*Primary Examiner* — Jimmy T Vu
(74) *Attorney, Agent, or Firm* — Crowell & Moring LLP

(57) ABSTRACT

A lighting apparatus for a motor vehicle having a processing module configured to receive, process and send signals from a data bus of the motor vehicle, and a light-emitting diode (LED) unit configured to emit light of adjustable brightness and prescribed color locus, where the LED unit has a microcontroller and a plurality of LEDs. The microcontroller and the LEDs are surrounded by a package of the LED unit, and the LED unit has a temperature sensor configured to measure a present temperature value on the LED unit and to communicate bidirectionally with the processing module so that the present temperature value on the LED unit is ascertainable by the temperature sensor and the processing module.

17 Claims, 3 Drawing Sheets

(51) Int. Cl.
  *B60Q 3/80* (2017.01)
  *B60Q 3/60* (2017.01)
  *B60Q 1/00* (2006.01)
  *H05B 47/18* (2020.01)

(52) U.S. Cl.
  CPC .............. *H05B 45/10* (2020.01); *H05B 47/18* (2020.01); *B60Q 2400/20* (2013.01); *B60Q 2500/00* (2013.01)

(58) Field of Classification Search
  CPC ...... H05B 47/10; H05B 47/18; B60Q 1/0023; B60Q 3/60; B60Q 3/80; B60Q 2400/20; B60Q 2500/00
  See application file for complete search history.

(56) References Cited

U.S. PATENT DOCUMENTS

| | | |
|---|---|---|
| 2011/0309746 A1 | 12/2011 | Eckel et al. |
| 2012/0139446 A1* | 6/2012 | Koren ................. H05B 33/0842 315/297 |
| 2012/0169232 A1 | 7/2012 | Behr et al. |
| 2014/0055030 A1 | 2/2014 | Kuang et al. |
| 2016/0023594 A1 | 1/2016 | Salter et al. |

FOREIGN PATENT DOCUMENTS

| | | |
|---|---|---|
| CN | 106274657 A | 1/2017 |
| DE | 10 2015 009 736 A1 | 7/2016 |
| EP | 2 412 206 B1 | 2/2017 |
| WO | WO 2014/067830 A1 | 5/2014 |

OTHER PUBLICATIONS

PCT/EP2017/076527, International Search Report dated Jan. 16, 2018 (Two (2) pages).
German Search Report issued in German counterpart application No. 10 2016 221 771.2 dated Jun. 14, 2017, with Statement of Relevancy (Eight (8) pages).
German-language European Office Action issued in European application No. 17 791 012.2—1202 dated Apr. 8, 2020 (Seven (7) pages).

* cited by examiner

LIGHTING DEVICE AND LIGHTING SYSTEM FOR A MOTOR VEHICLE AND METHOD FOR OPERATING A LIGHTING SYSTEM FOR A MOTOR VEHICLE

CROSS REFERENCE TO RELATED APPLICATIONS

This application is a continuation of PCT International Application No. PCT/EP2017/076527, filed Oct. 18, 2017, which claims priority under 35 U.S.C. § 119 from German Patent Application No. 10 2016 221 771.2, filed Nov. 7, 2016, the entire disclosures of which are herein expressly incorporated by reference.

BACKGROUND AND SUMMARY OF THE INVENTION

The invention relates to a lighting apparatus and a lighting system for a motor vehicle and to a corresponding method for operating a lighting system that allow a space-saving arrangement and reliable and extended operation of the lighting apparatus.

Lighting apparatuses in motor vehicles having multicolor LED units (LED="light-emitting diode") are known from the prior art. Such LED units normally comprise multiple single-color LEDs and are usually actuated by means of LED drivers in order to vary a desired brightness and a color locus (i.e. a mixed color). This is accomplished by using a module having a microprocessor that firstly undertakes communication with a motor vehicle data bus and secondly drives the LED units, usually via PWM outputs (PWM="pulse-width modulation"). The motor vehicle data bus frequently used in this case is what is known as the LIN bus (LIN="Local Interconnect Network").

Some multi-color LED units have an integrated circuit accommodated together with the single-color LEDs in a common package, which allows a high packing density to be achieved. The individual LED units are controlled by means of a data stream. In this case, configurations that are needed in lighting apparatuses having multicolor LED units to operate the individual LED units are deposited in a central processing module.

The document WO 2014/067830 A1 discloses a method and an arrangement for temperature-corrected control of LEDs by means of look-up tables. In this case, an LED module comprising multiple LED channels for each target color locus achievable by the LED module has provision in it for a lookup table storing the operating current for each LED channel on the basis of temperature.

It is an object on which the invention is based to provide a lighting apparatus and a lighting system for a motor vehicle and also a corresponding method for operating a lighting system that allow a space-saving arrangement and can contribute to reliable and extended operation of the lighting apparatus.

According to a first aspect of the invention, a lighting apparatus for a motor vehicle comprises a processing module designed to receive, process and send signals from a data bus of the motor vehicle. The lighting apparatus further comprises an LED unit designed so as in an operational state to emit light of adjustable brightness and prescribed color locus, wherein the LED unit has a microcontroller and a plurality of LEDs and wherein the microcontroller and the LEDs are surrounded by a package of the LED unit. The LED unit additionally comprises a temperature sensor designed to measure a present temperature value on the LED unit and to communicate bidirectionally with the processing module, so that the present temperature value on the LED unit can be ascertained by means of the temperature sensor and the processing module.

The lighting apparatus described is not only able to be used to reproduce a space-saving lighting function, for example in order to light a section in or on a motor vehicle, but rather the design described furthermore allows a present temperature value at the location of the LED unit to be recalled by virtue of the temperature sensor being actuated by means of the processing module. In this way, the LED unit capable of lighting can be used to collect data containing, in association with the temperature sensor, information about an ambient temperature. The described lighting apparatus therefore produces an arrangement that, by actuating the LED unit, allows desired lighting and, on the basis of the bidirectional communication capability, allows data to be read back from the LED unit.

The lighting apparatus is intended for a motor vehicle, such as, for example, a passenger vehicle and if need be also a truck. Preferably, the lighting apparatus has multiple LED units that each comprise a microcontroller and multiple LEDs and also an internal temperature sensor, each of which are integrated in a common package of the respective LED unit. A single LED unit therefore produces a semiconductor device that, owing to the internal microcontroller, can also be referred to as a "smart" LED.

Preferably, the respective LED unit is connected to an internal data bus (i.e. a data bus inside the lighting apparatus) that is in turn coupled to the processing module. The processing module can be used to receive, process and send signals. Such signals comprise, by way of example, external control commands from a motor vehicle data bus that are able to be converted into internal control commands by means of the processing module and put onto the internal data bus in order to adjust the brightness and the color locus of one or more LED units. The internal data bus can be e.g. an SPI data bus (SPI="Serial Peripheral Interface") or if need be also another data bus, such as e.g. a differential data bus, which encodes digital data by using a voltage difference between two lines. The motor vehicle data bus can be a LIN bus (LIN="Local Interconnect Network") or a CAN bus (CAN="Controller Area Network"), for example.

The one or more LED units each have adjustable brightness (i.e. light intensity) and emit light of a prescribed color locus. The term color locus describes a color of the emitting light and can be realized in a single color or as a mixed color produced by the respective LED unit. The color locus can be indicated as a locus in a color chart, for example, in particular in a color chart of the CIE standard chromaticity system (CIE="Commission Internationale de l'éclairage").

For example, an LED unit can have multiple LEDs emitting blue light or light of different color or wavelength. In the latter case, the LED unit produces a multicolor LED unit of adjustable color locus. A respective LED unit, as a single semiconductor device, preferably has at least three single-color LEDs of different color that are accommodated together with the microcontroller of the LED unit in a common package of the semiconductor device. Furthermore, the semiconductor device of a respective LED unit incorporates the temperature sensor by means of which a present (i.e. currently available) temperature value on the respective LED unit is measurable and can be provided to the processing module and/or the microcontroller.

On the basis of the present temperature value of the respective LED unit, the latter can be selectively actuated by means of the microcontroller, so that a contribution to reliable and beneficial operation of the lighting apparatus is made. Based on the control of the operating current of the respective LED of an LED unit, each LED of the LED unit can be individually actuated by means of the microcontroller, for example by means of pulse-width modulation. Furthermore, the described lighting apparatus allows a present temperature value to be ascertained and recalled independently of control of the lighting function, so that the processing module and the temperature sensor can be used to collect data and check a present temperature value at any time.

The direct integration of a temperature sensor in the respective LED unit allows a present temperature at the position of the LED unit to be recorded precisely, so that voltage and temperature differences can be handled immediately and said differences can be taken into consideration and compensated for internally in the LED unit in one mode. Additionally, the data collected by the processing module can be processed further and, by way of example, color profiles and color changes can be ascertained/made by means of the microcontroller. The temperature measurement by means of the temperature sensor can be based on known technologies in this case. For example, the temperature sensor can record the temperature by means of a resistance measurement or by means of infrared or by means of a diode.

The described lighting apparatus therefore has a multiplicity of functions that are each integrated in a semiconductor package of an LED unit, so that cabling or wiring required between the LED unit and the processing module can be reduced and the processing module as an actuation controller can be configured to be smaller. In this way, a space-saving design of the lighting apparatus can be produced that can have an advantageous effect on possible installation positions in or on a motor vehicle. Such an installation space advantage is present in particular in the case of a lighting apparatus having a large number of LED units.

On the basis of the described design of the lighting apparatus and the communication capability of the temperature sensor, a communication rate falls while a transmission rate for data rises. In this way, the lighting apparatus can be used to make a useful contribution for an electromagnetic compatibility in a motor vehicle. Furthermore, interface costs can be reduced, since they can be configured to be smaller. A video capability of the lighting apparatus is retained in this case, since sufficient frames per second are transmittable. Additionally, the LED unit can comprise a further temperature sensor in order to allow particularly reliable ascertainment and recall of a present temperature value on the LED unit.

The data collectable by means of the lighting apparatus from a respective LED unit can furthermore contribute to maintaining or improving what is known as the ASIL standard (ASIL="Automotive Safety Integrity Level"). Said standard is geared to ensuring a prescribed basic safety level.

According to one development of the lighting apparatus, the temperature sensor is designed to communicate bidirectionally with the microcontroller, so that the present temperature value on the LED unit is recallable by means of the temperature sensor and the microcontroller. Besides direct communication with the processing module, it is also possible for communication to be set up by the respective microcontroller of the LED unit in order to recall a present temperature value on the associated LED unit.

According to one development of the lighting apparatus, the present temperature value on the LED unit is recallable independently of an operating state of the LEDs. The present temperature value on the LED unit can be ascertained and recalled independently of actuation and operation of the respective LEDs. On the basis of the described design, the lighting apparatus can thus be used beyond its lighting function to collect data about an ambient temperature at the location of the respective LED unit. It is also possible for the present temperature value to be ascertained during lighting by means of the LEDs, however, and for said ascertainment to be included in activation of the lighting function for useful operation of the lighting apparatus in order to provide temperature-dependent control of the operation of the respective LED unit.

For example, control of the operation of the LED unit can be matched to present ambient conditions on the basis of temperature. In this way, it is also possible for a selected color locus and a selected brightness to be kept as constant as possible in one mode of the respective LED unit, for example. Therefore, local temperatures of the individual LED units can be taken into consideration to individually and precisely select a desired brightness and a prescribed color locus, as a result of which a constant appearance of the lighting apparatus is achieved. Furthermore, the brightness of the respective LED unit can be decreased in controlled fashion by means of the microcontroller in order to avoid damaging the LED unit on account of excessive temperatures.

According to one development of the lighting apparatus, the microcontroller and the processing module are designed to communicate bidirectionally with one another. The processing module is in particular configured to communicate with the temperature sensor of a respective LED unit by signaling and to recall a present temperature value. Such communication comprises receiving and sending data and can be effected between the respective components directly. Alternatively or additionally, the processing module is designed to use the microcontroller to communicate with the associated temperature sensor of the respective LED unit. The processing module can be used to individually recall any LED unit or any temperature sensor of the respective LED unit in each case, which means that a high level of scalability of the lighting apparatus is possible.

According to one development of the lighting apparatus, the LED unit is in the form of a multicolor LED unit and the LEDs are each in the form of single-color LEDs. According to a further development of the lighting apparatus, the LED unit comprises an RGB LED unit and/or an RGBW LED unit. In a manner known per se, an RGB LED unit comprises a red, a green and a blue single-color LED and an RGBW LED unit also comprises a white-light LED in addition to a red, a green and a blue LED.

According to one development of the lighting apparatus, the LED unit has a light sensor designed to measure a present brightness value on the LED unit and to communicate bidirectionally with the processing module, so that the present brightness value on the LED unit is recallable by means of the light sensor and the processing module. The light sensor can be used to collect further data of the LED unit that are able to contribute to reliable and extended operation of the lighting apparatus.

The light sensor can be in the form of a separate element arranged in the package of the respective LED unit and, analogously to the temperature sensor, able to be actuated by means of the processing module and/or by means of the associated microcontroller. Alternatively or additionally, the LED unit per se can act as a light sensor, which means that a separate light sensor is not needed for ascertaining and recalling a present brightness value on the LED unit. The LED unit produces a semiconductor device that, in one mode, emits light when a voltage or electric current is applied. Furthermore, the LED unit can act as a semiconductor diode, such as a photodiode, in a non-operational mode of the LEDs, so that an electric current or a voltage is generated on the basis of incident light radiation.

The described lighting apparatus is used not only to provide a lighting function but also for functional sensors and uses available installation space to collect further data. The LED technology of the lighting apparatus is therefore usefully employable for lighting and temperature measurement and if need be for brightness measurement and allows data to be retrieved even if a voltage is in the meantime no longer present. In such a case, a previous actual state can be recalled. On the basis of the described design of the lighting apparatus or of a respective LED unit, the processing module as an actuation module can be of smaller embodiment, so that a further contribution is made to a clear and space-saving design. Furthermore, a multiplicity of LED units arranged in and/or on a motor vehicle in an installed state can be used to ascertain correlations over a vehicle collective of the motor vehicle and to obtain information about local characteristics of a respectively installed LED unit.

According to a further aspect of the invention, a lighting system for a motor vehicle comprises at least one configuration of the above-described lighting apparatus and the motor vehicle. The lighting apparatus is in particular arranged and installed in or on the motor vehicle and forms an interior lighting and/or an exterior lighting. The motor vehicle can also have multiple configurations of the described lighting apparatus, one of which is arranged in and another of which is arranged on the motor vehicle and performs an applicable lighting function, for example. This allows appealing light effects with a homogeneous appearance to be generated. Furthermore, the lighting apparatus allows a present temperature value on the respective LED unit to be recalled independently of the operating state of the LEDs and of a possibly activated lighting function. Since the lighting system comprises at least one configuration of the above-described lighting apparatus, all of the features and properties of the lighting apparatus are also disclosed for the lighting system, and vice versa.

According to a further aspect of the invention, a method for operating a configuration of the above-described lighting system for a motor vehicle comprises actuating the temperature sensor by means of the processing module to ascertain a present temperature value on the LED unit and receiving measurement signals of the temperature sensor. The method further comprises ascertaining a present temperature value on the LED unit on the basis of the received measurement signals of the temperature sensor and controlling a function of the motor vehicle on the basis of the ascertained temperature value on the LED unit.

The described method allows a present temperature value on the respective LED unit of the lighting system or of the lighting apparatus to be recalled, so that a value of an ambient temperature at the location of the respective LED unit can be ascertained, for example. The controlling of a function of the motor vehicle can comprise operation of the LED unit or of the lighting function of the lighting apparatus, but the method also allows a function to be controlled on the basis of the ascertained temperature value apart from the light-emitting mode of the LED unit.

The data collected by means of the LED unit are collected and evaluated, or provided for later processing, by the processing module. The ascertained temperature value can be stored in a database of the motor vehicle or in an external database, for example, and deposited for further evaluations in order to be able to ascertain a temperature profile, for example. The ascertained temperature value can also be used to control a ventilation or air-conditioning system of the motor vehicle on the basis of the ascertained temperature value, for example. The microcontroller is for example configured such that it starts communicating with the processing module in the event of the present temperature value being above or below a prescribed threshold and provides an output that is converted into an external control command for the motor vehicle data bus and that brings about activation of the air-conditioning system of the motor vehicle and hence initiates heating or cooling of the vehicle interior. Such adjusting of a vehicle interior temperature can be performed locally in the area of the respective LED unit if need be, so that only the rear vehicle area is heated, for example.

Recalling or ascertaining a present temperature value at the position of the LED unit can be performed continually or at prescribed intervals of time or on the basis of an instruction. Since the method for operating a configuration of the above-described lighting system comprises a method for operating a configuration of the above-described lighting apparatus, all of the features and properties of the lighting apparatus are also disclosed for the method for operating the lighting system, and vice versa.

The method can further comprise actuating the light sensor by means of the processing module to ascertain a present brightness value on the LED unit, so that received measurement signals of the light sensor are taken as a basis for ascertaining a brightness value at the location of the LED unit and a function of the motor vehicle is controlled on the basis of the ascertained brightness value.

Exemplary embodiments of the invention are explained in more detail below on the basis of the schematic drawings, in which:

Other objects, advantages and novel features of the present invention will become apparent from the following detailed description of one or more preferred embodiments when considered in conjunction with the accompanying drawings.

Elements having the same design or function are denoted by the same reference signs throughout the figures. For reasons of clarity, if necessary not all depicted elements are denoted by associated reference signs in all of the figures.

DETAILED DESCRIPTION OF THE DRAWINGS

Figure 1:
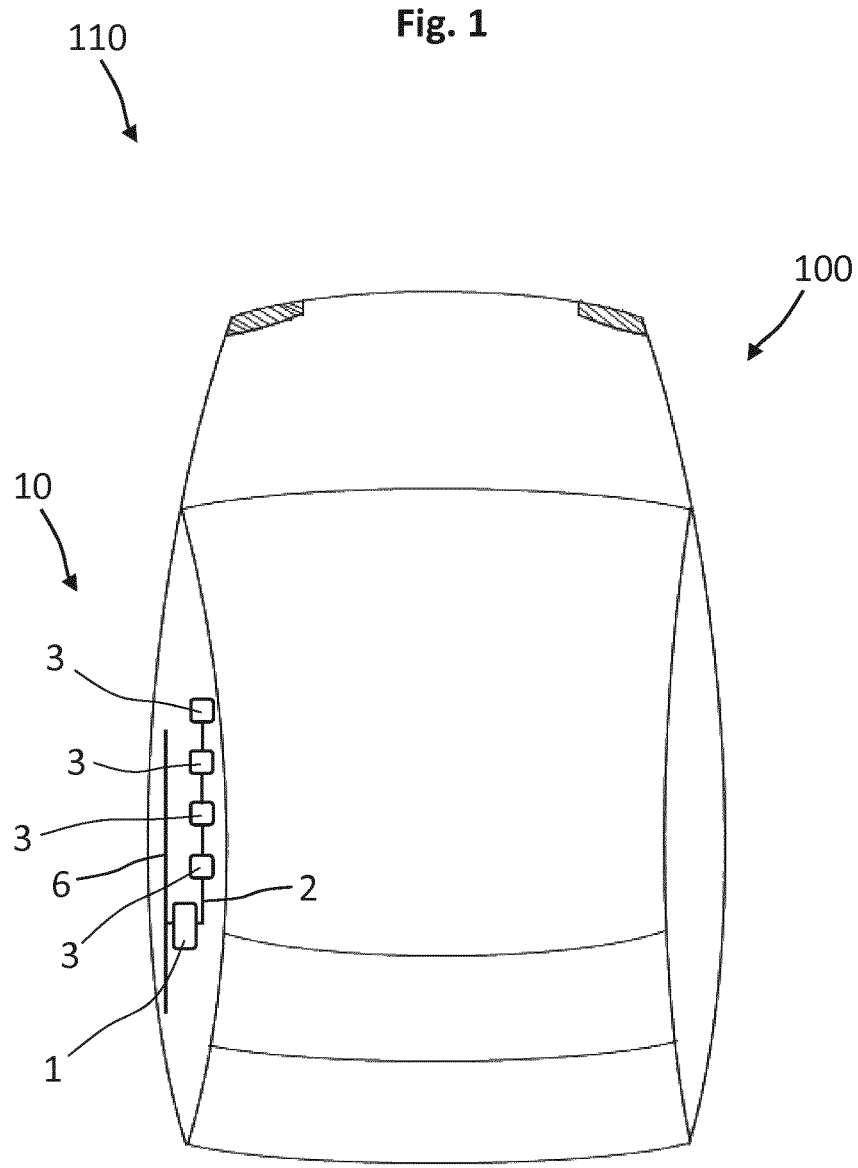
FIG. 1 shows an exemplary embodiment of a lighting system for a motor vehicle in a schematic plan view.
Figure 1:
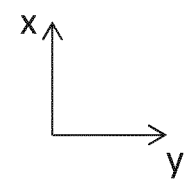

FIG. 1 uses a plan view to schematically illustrate a lighting system 110 comprising a motor vehicle 100 and a lighting apparatus 10 having a plurality of LED units 3. The LED units 3 are each coupled to an internal data bus 2 that in turn couples the LED units 3 to a processing module 1. The processing module 1 is in turn coupled to a motor vehicle data bus 6.

As explained in more detail on the basis of FIGS. 2 and 3 below, the lighting apparatus 10 or the lighting system 110 allows a space-saving lighting function, for example in order to light a section in or on the motor vehicle 100, and furthermore allows ascertainment of a present temperature value at the location of a respective LED unit 3, also independently of the respective lighting function.

Figure 2:
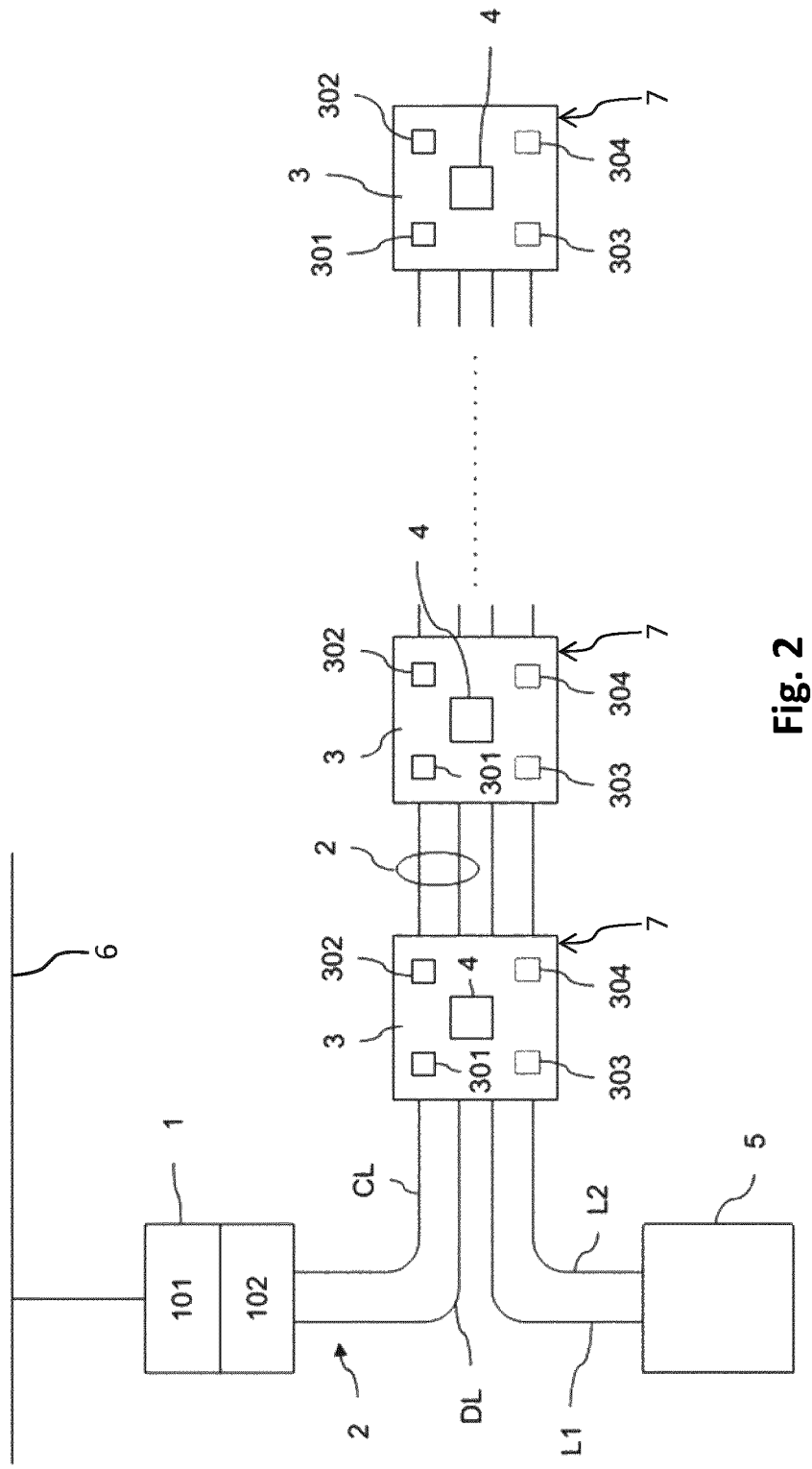
FIG. 2 shows an exemplary embodiment of a lighting apparatus for a motor vehicle in a schematic depiction.

FIG. 2 schematically depicts an embodiment of the lighting apparatus 10 that, as illustrated in FIG. 1, forms an interior lighting in the motor vehicle 100, for example. Alternatively, the lighting apparatus 10 can be arranged on the motor vehicle 100 as exterior lighting or the lighting system 110 comprises multiple lighting apparatuses 10 installed in and/or on the motor vehicle 100.

As illuminants, the lighting apparatus 10 has a plurality of multicolor LED units 3 arranged on a band. These multicolor LED units 3, which are subsequently also referred to simply as LED units 3, each produce a single semiconductor device having multiple single-color LEDs 301-304 and a microcontroller 4. The single-color LEDs 301-304 and the microcontroller 4 are surrounded by a package 7 of a respective LED unit 3 and integrated in the package 7 of the semiconductor device together with a temperature sensor 8 (see FIG. 3).

The single-color LED 301 is for example in the form of a red LED, the single-color LED 302 is in the form of a green LED, the single-color LED 303 is in the form of a blue LED and the single-color LED 304 is in the form of a white LED. The color details in this case relate to the color or the wavelength or the wavelength range of the light emitting from the respective LED. The LED units 3 arranged in the form of a band can be used to achieve a very high packing density (depending on the package shape of for example 144 to 367 LEDs/m), which means that a space-saving design is attainable by means of the lighting apparatus 10.

The individual LED units 3 are actuated by means of a digital datastream in the form of a bitstream that is supplied to the individual LED units 3 by means of the internal data bus 2 of the lighting apparatus 10. The internal data bus 2 comprises a line CL for the clock and a line DL for the bitstream.

The signals on the internal data bus 2 come from the processing module 1 coupled to the motor vehicle data bus 6 of the motor vehicle 100. The processing module 1 comprises a LIN transceiver 101, which taps off applicable digital signals for actuating the LED units 3 from the motor vehicle data bus 6, and a microprocessor 102, which converts the tapped-off signals into applicable data signals on the data line DL of the internal data bus 2. The signals transmitted on the motor vehicle data bus 6 in this instance comprise signals that are intended for the lighting apparatus 10 and stimulate a light pattern to be selected for the lighting apparatus 10.

These signals in turn come from a controller of the motor vehicle 100 that, by way of example, takes an input by the driver as a basis for stipulating the light pattern to be generated and puts it onto the motor vehicle data bus 6 as an applicable signal. The processing module 1 is used to detect whether the light pattern is intended for the lighting apparatus in accordance with the present signal on the motor vehicle data bus 6. If this is the case, the signal is converted into an applicable signal for the internal data bus 2 by means of the microprocessor 102.

The motor vehicle data bus 6 is a LIN bus (LIN="Local Interconnect Network"), for example. The internal data bus 2 can be an SPI bus (SPI="Serial Peripheral Interface"), for example. Preferably, the signals for the internal data bus 2 are generated by the microprocessor 102 by means of a piece of SPI software in this case. A piece of SPI software is a program library that allows any free pins of the microprocessor 102 to be used for signal delivery to the SPI bus. Alternatively, however, SPI hardware can also be used. In this case, specific SPI pins are intended for signal delivery to the SPI bus. The use of SPI software is advantageous, since there can be provision in the internal data bus 2 for multiple lines DL and CL for actuating a larger number of LED units 3. The internal data bus 2 can, as an alternative to an SPI bus, also be configured as a differential data bus or as any other data bus. A differential data bus is distinguished in that it encodes digital data by using a voltage difference between two lines.

In the embodiment shown in FIG. 2, besides the lines CL and DL, there is provision for two power lines L1 and L2 that are connected to a DC power supply 5. Based on the bitstream received via the data line DL, pulse-width modulation (PWM) of the current supplied for the individual LEDs 301-304 is effected in order thereby to actuate the LEDs 301-304 in accordance with the bitstream on the data line DL.

Figure 3:
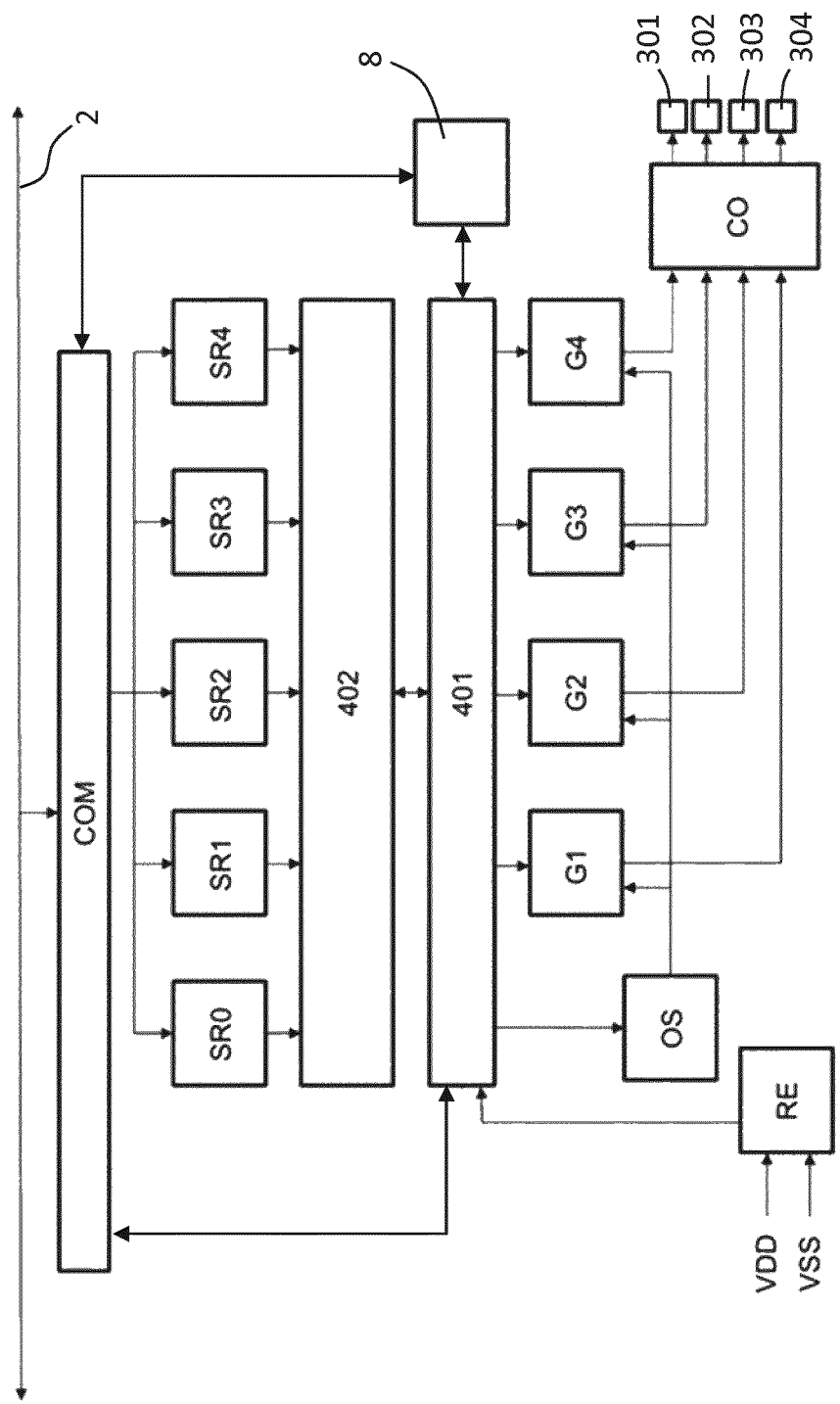
FIG. 3 shows an exemplary embodiment of an LED unit of the lighting apparatus shown in FIG. 2 in a detail view.

The design of a single LED unit 3 as shown in FIGS. 1 and 2 is illustrated in detail in FIG. 3. The depicted components of the LED unit 3 are in this case integrated in a single semiconductor device. The signals of the internal data bus 2 are received via a communication interface CON of the LED unit 3. The clock signal of the clock line CL is forwarded to the microprocessor 401 described later on, whereas the datastream of the data line DL, after decoding in the communication interface COM, is passed to 8-bit shift registers SR0-SR4. In this case, the value output by the shift register SR0 indicates the desired total brightness of the LED unit 3, whereas the values of the shift registers SR1 to SR4 are used to output the color components of the individual single-color LEDs 301-304 to produce the desired mixed color. In particular, the shift register SR1 is used to output the color component of the red-emitting LED 301, the shift register SR2 is used to output the color component of the green-emitting LED 302, the shift register 303 is used to output the color component of the blue emitting LED 303 and the shift register 304 is used to output the color component of the white-light-emitting LED 304.

The values of the individual shift registers are supplied to the microcontroller 4, which has logic or a microprocessor 401 and an associated nonvolatile EEPROM memory 402. This memory 402 can have in particular calibration data deposited in it that come from a calibration process of the LED unit 3 and stipulate, for a prescribed standard temperature value of the LED unit 3, how the operating currents of the individual single-color LEDs 301-304 need to be selected so that the total brightness coming from the shift register SR0 and the color mix (i.e. the color locus in this regard) are achieved in accordance with the values from the shift registers SR1 to SR4.

The microprocessor 401 resorts to the values deposited in the memory 402 and can receive a present temperature value by means of a temperature sensor 8 integrated in the semiconductor device of the LED unit 3. The microprocessor 401 has for example a temperature algorithm deposited in it that, by accessing the memory 402, determines the applicable operating currents for the aforementioned standard temperature value and corrects these operating currents in suitable fashion in the event of disparity between the present temperature value coming from the temperature sensor 8 and the standard temperature value.

In this way, the correction can be used to correctly select and keep constant a desired brightness and a prescribed color locus in accordance with the values from the shift registers SR0-SR4 even in the event of temperature fluctuations. The temperature algorithm of the microprocessor 401 therefore takes into consideration the fact that the temperature of the LED unit 3 affects operation thereof, so that a temperature-dependent correction is performable to achieve a desirable brightness and a desirable color locus.

The temperature sensor 8 is designed to use the communication interface COM to communicate with the processing module 1. Such communication comprises receiving and sending signals or data of the respective components. In this way, the processing module 1 and the temperature sensor 8 can be used to ascertain and recall a present temperature value at the location of the respective LED unit 3.

Such recalling of the present temperature value can in particular also be effected independently of the operating state of the LEDs 301-304, so that, on the basis of the described design of the LED unit 3 and the communication capability of the processing module 1 and of the temperature sensor 8, the present temperature value can be recalled at any time. By way of example, the processing module 1 requests the present temperature value from the temperature sensor 8 at prescribed intervals of time, so that the temperature sensor 8 measures the temperature and provides the measurement signals for the processing module 1. Alternatively or additionally, communication between the processing module 1 and the temperature sensor 8 can be effected by means of the microcontroller 401 of the respective LED unit 3, which microcontroller is coupled to the processing module 1 and to the temperature sensor 8 for signaling purposes and allows bidirectional communication between the two components.

In this way, a precise temperature measurement can be performed at the location of the LED unit 3 even if the lighting function is inactive. Also, the operation of the individual multicolor LED units 3 of the lighting apparatus 10 can be adjusted individually and precisely to suit the present temperatures.

The operating currents for the individual LEDs 301-304 are provided by means of a voltage regulator RE that obtains the positive voltage VDD and the negative voltage VSS from the power supply 5 shown in FIG. 2. The microprocessor 401 further generates a clock pulse for an applicable oscillator OS, which is supplied to PWM generators G1-G4. The operating currents of the individual LEDs 301-304 are produced in the generators G1 to G4 by means of pulse-width modulation. The values of the operating currents, which values come from the algorithm for temperature compensation, are passed to the individual generators G1-G4 by the microprocessor 401. The generator G1 uses pulse-width modulation to produce the current for the red-emitting LED 301, the generator G2 produces the current for the green-emitting LED 302, the generator G3 produces the current for the blue-emitting LED 303 and the generator G4 produces the current for the white-emitting LED 304. The PWM signals generated by the individual generators, which signals reach the single-color LEDs 301-304 via the current output CO, are then used to select the applicable light having the desired brightness and the desired color locus for LED unit 3 according to the signal that reaches the LED unit 3 via the internal data bus 2.

The described lighting apparatus 10 and the lighting system 110 can be used to usefully control the light-emitting mode and further functions of the motor vehicle 100. By way of example, independently of the lighting function, a fan or air conditioning system of the motor vehicle 100 can be activated on the basis of the or multiple ascertained temperature values in order to initiate heating or cooling of the vehicle interior.

On the basis of the described design and the outlined properties, the lighting apparatus 10 allows temperature adjustment based on ascertainment and recall of the present temperature value, which is precisely determinable by means of the temperature sensor 8 in the semiconductor device at the location of the respective multicolor LED unit 3.

LIST OF REFERENCE SIGNS

1 Processing module
10 Lighting apparatus
100 Motor vehicle
101 LIN transceiver
102 Microprocessor
110 Lighting system
2 Internal data bus
3 Multicolor LED unit
301-304 Single-color LEDs
4 Microcontroller
401 Microprocessor
402 EEPROM
5 Power supply
6 Motor vehicle data bus
7 Package of the LED unit
8 Temperature sensor
CL Line for clock signal
CO Current output
COM Communication interface
DL Data line
G1-G4 PWM generators
L1-L2 Power lines
OS Oscillator
RE Voltage regulator
SR0-SR4 Shift registers
VDD, VSS Voltages The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A lighting apparatus for a motor vehicle, comprising:
a processing module configured to receive, process and send signals from a data bus of the motor vehicle, and
a light-emitting diode (LED) unit configured to emit light of adjustable brightness and prescribed color locus, wherein the LED unit has a microcontroller and a plurality of LEDs,
wherein the microcontroller and the LEDs are surrounded by a package of the LED unit, and
wherein the LED unit comprises a temperature sensor configured to measure a present temperature value on the LED unit and to communicate bidirectionally with the processing module so that the present temperature value on the LED unit is ascertained by the temperature sensor and the processing module.
2. The lighting apparatus as claimed in claim 1, wherein the temperature sensor is configured to communicate bidirectionally with the microcontroller so that the present temperature value on the LED unit is recalled by the temperature sensor and the microcontroller.

3. The lighting apparatus as claimed in claim 1, wherein the present temperature value on the LED unit is recalled independently of an operating state of the LEDs.

4. The lighting apparatus as claimed in claim 2, wherein the present temperature value on the LED unit is recalled independently of an operating state of the LEDs.

5. The lighting apparatus as claimed claim 1, wherein the microcontroller and the processing module are configured to communicate bidirectionally with one another.

6. The lighting apparatus as claimed in claim 2, wherein the microcontroller and the processing module are configured to communicate bidirectionally with one another.

7. The lighting apparatus as claimed in claim 3, wherein the microcontroller and the processing module are configured to communicate bidirectionally with one another.

8. The lighting apparatus as claimed in claim 1, wherein the LED unit is a multicolor LED unit and the LEDs are each single-color LEDs.

9. The lighting apparatus as claimed in claim 1, wherein the LED unit comprises an RGB LED unit and/or an RGBW LED unit.

10. The lighting apparatus as claimed in claim 1, wherein the LED unit has a light sensor configured to measure a present brightness value on the LED unit and to communicate bidirectionally with the processing module so that the present brightness value on the LED unit is recalled by the light sensor and the processing module.

11. A lighting system for a motor vehicle, comprising:
the motor vehicle, and
at least one lighting apparatus comprising:
a processing module configured to receive, process and send signals from a data bus of the motor vehicle, and
a light-emitting diode (LED) unit configured to emit light of adjustable brightness and prescribed color locus, wherein the LED unit has a microcontroller and a plurality of LEDs,
wherein the microcontroller and the LEDs are surrounded by a package of the LED unit, and
wherein the LED unit comprises a temperature sensor configured to measure a present temperature value on the LED unit and to communicate bidirectionally with the processing module so that the present temperature value on the LED unit is ascertained by the temperature sensor and the processing module.

12. The lighting system as claimed in claim 11, wherein the lighting apparatus is arranged in the motor vehicle and is in the form of interior lighting.

13. The lighting system as claimed in claim 11, in which the lighting apparatus is arranged on an outside of the motor vehicle and is in the form of exterior lighting.

14. A method for operating a lighting system for a motor vehicle, the lighting system comprising lighting apparatus having a processing module configured to receive, process and send signals from a data bus of the motor vehicle, a light-emitting diode (LED) unit configured to emit light of adjustable brightness and prescribed color locus, wherein the LED unit has a microcontroller and a plurality of LEDs, wherein the microcontroller and the LEDs are surrounded by a package of the LED unit, and wherein the LED unit comprises a temperature sensor configured to measure a present temperature value on the LED unit and to communicate bidirectionally with the processing module, the method comprising:
actuating the temperature sensor by the processing module to ascertain a present temperature value on the LED unit,
receiving measurement signals of the temperature sensor,
ascertaining a present temperature value on the LED unit based on the received measurement signals of the temperature sensor, and
controlling the function of the motor vehicle based on the ascertained temperature value on the LED unit.

15. The method as claimed in claim 14, wherein the LED unit has a light sensor configured to measure a present brightness value on the LED unit and to communicate bidirectionally with the processing module, the method further comprising:
actuating the light sensor by the processing module to ascertain a present brightness value on the LED unit,
receiving measurement signals of the light sensor,
ascertaining a present brightness value on the LED unit based on the received measurement signals of the light sensor, and
controlling a function of the motor vehicle based on the ascertained brightness value on the LED unit.

16. The method as claimed in claim 14, wherein controlling the function of the motor vehicle based on the ascertained temperature value on the LED unit comprises storing the ascertained temperature value on the LED unit in a data memory.

17. The method as claimed in claim 15, wherein controlling the function of the motor vehicle based on the ascertained brightness value on the LED unit comprises storing the ascertained brightness value on the LED unit in a data memory.

* * * * *